April 30, 1929.  C. A. BERGMAN  1,711,442
BEET HARVESTER
Original Filed June 23, 1924   6 Sheets-Sheet 2
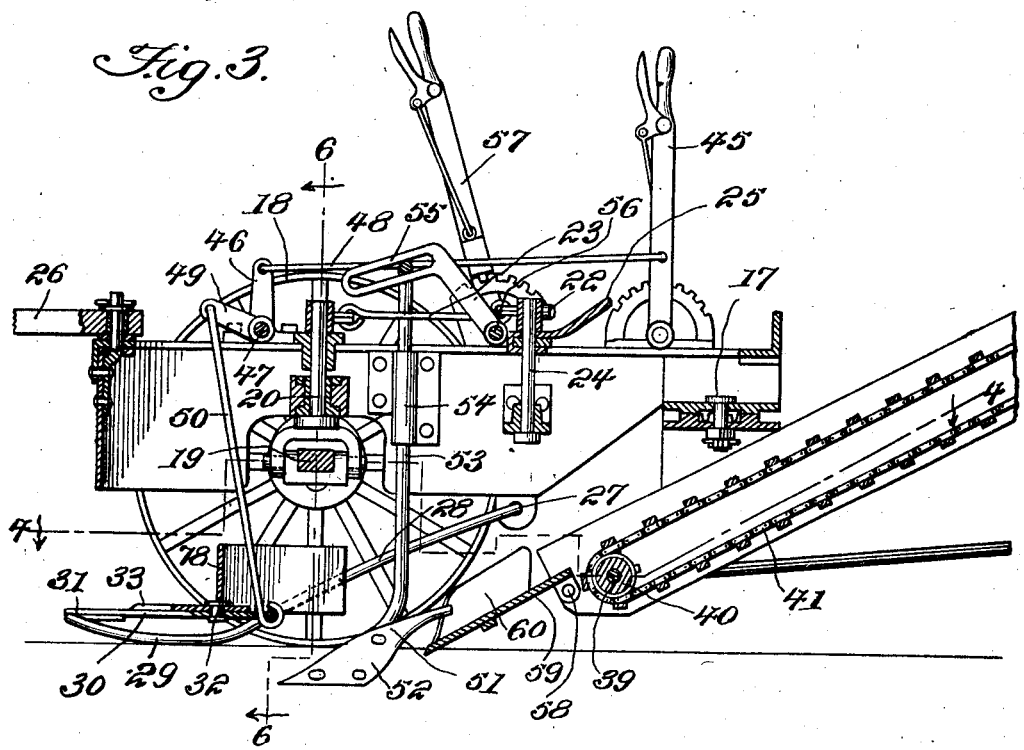
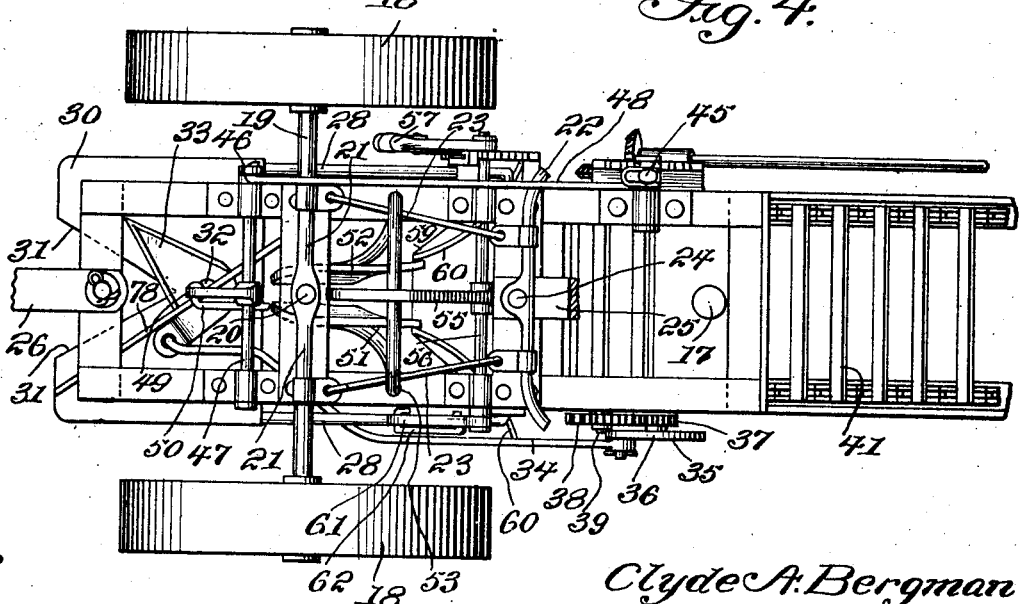

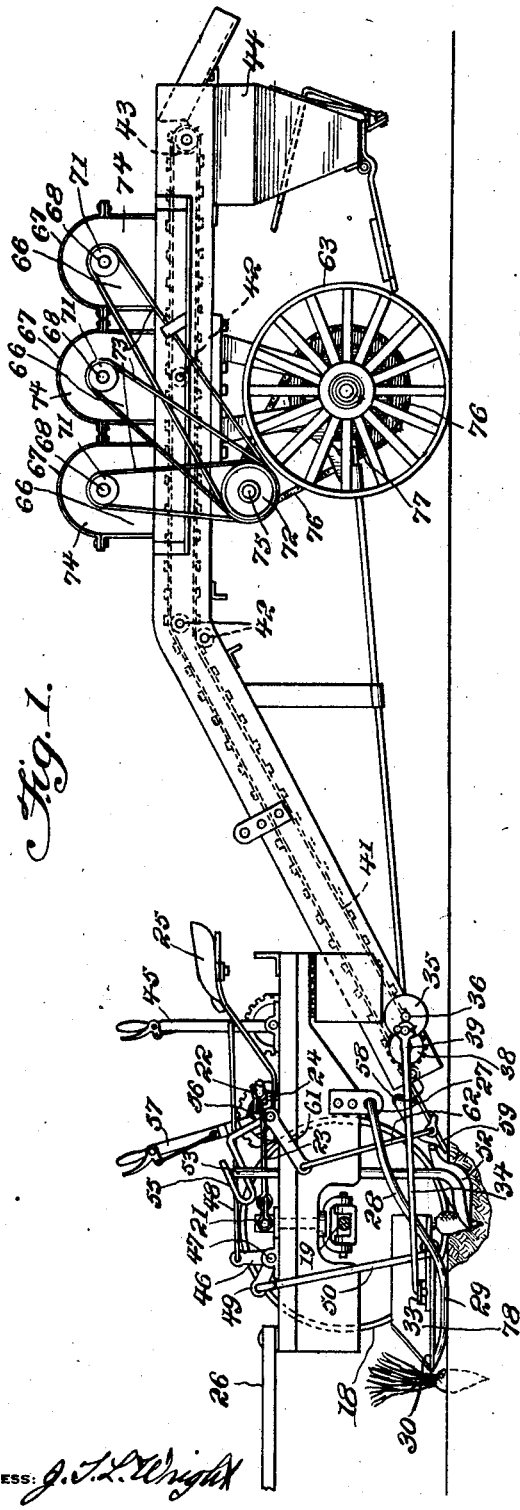
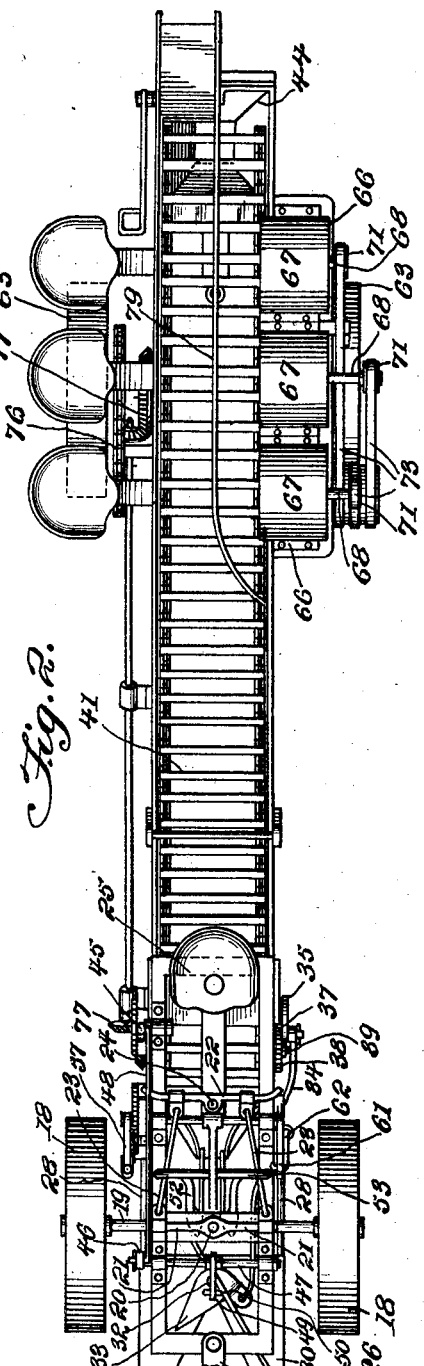

April 30, 1929.  C. A. BERGMAN  1,711,442
BEET HARVESTER
Original Filed June 23, 1924   6 Sheets-Sheet 3
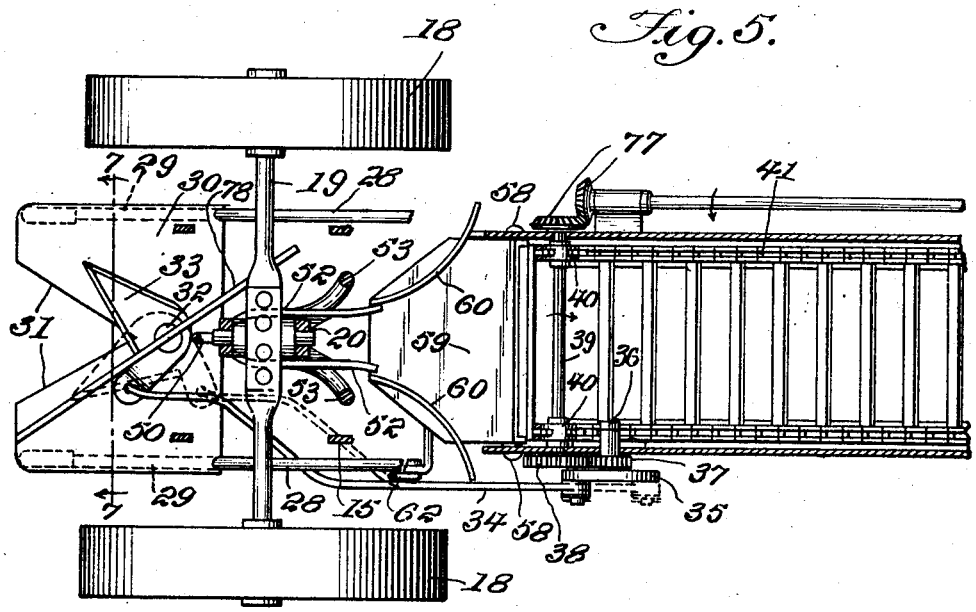
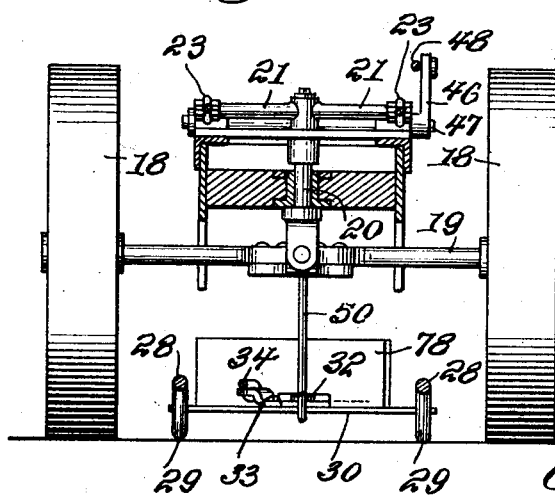
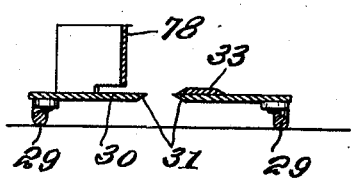

April 30, 1929.  C. A. BERGMAN  1,711,442
BEET HARVESTER
Original Filed June 23, 1924  6 Sheets-Sheet 4

Clyde A. Bergman
INVENTOR

BY Victor J. Evans
ATTORNEY

WITNESS: J. L. Wright

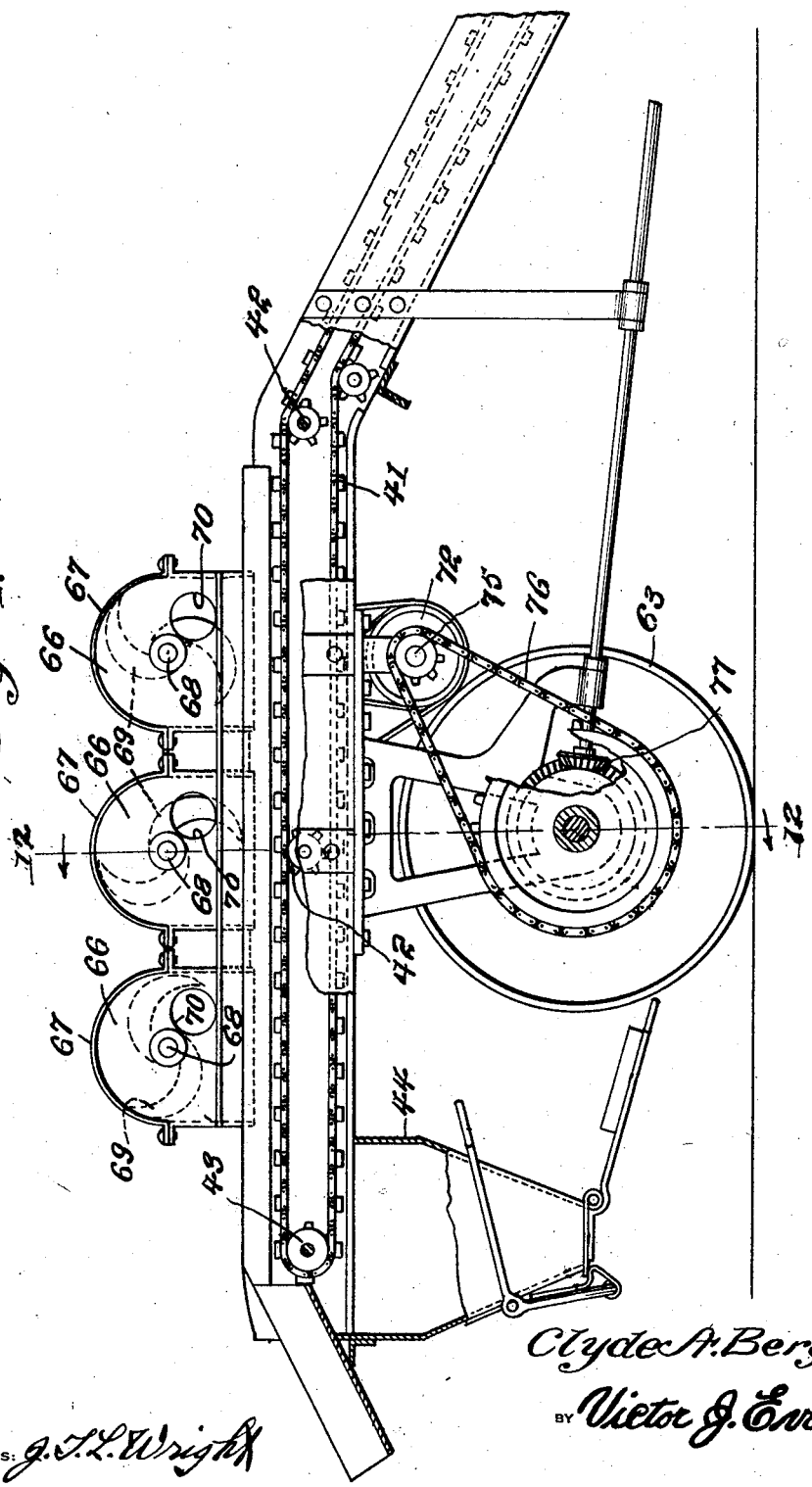

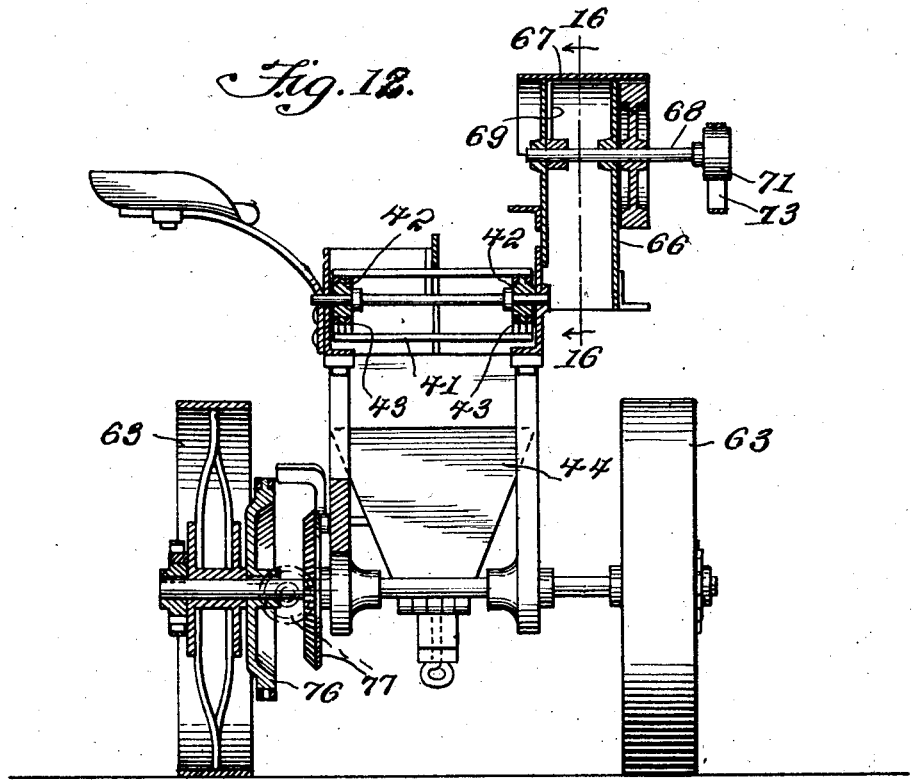

Patented Apr. 30, 1929.

1,711,442

UNITED STATES PATENT OFFICE.

CLYDE A. BERGMAN, OF LAMAR, COLORADO.

BEET HARVESTER.

Application filed June 23, 1924, Serial No. 721,865. Renewed September 19, 1928.

This invention relates to improvements in agricultural machines and has for an object the provision of a machine for harvesting beets which includes means for cutting the leaves from the beets so that the said leaves will not interfere with proper topping, with further means for pulling or digging the beets from the ground and conveying them to a series of topping knives, by means of which the beets may be topped in the proper manner after their removal from the ground.

Another object of the invention is the provision of an adjustable leaf cutter which operates in advance of the beet pulling means, together with a novel construction of adjustable shovel which is located at the rear of the pulling means and which directs the beets to a conveyor and the earth clods to each side thereof.

Another object of the invention is the provision of a novel arrangement and construction of topping knives, with means whereby the topped beets may be separated from the leaves and trash and directed into a hopper, while the tops, leaves, trash and so forth are directed to oposite sides of the machine.

With the above and other objects in view, the invention further includes the following novel features and details of construction, to be hereinafter more fully described, illustrated in the accompanying drawings and pointed out in the appended claims.

In the drawings:—

Figure 1 is a side elevation of a beet harvesting machine constructed in accordance with the invention.

Figure 2 is a similar view looking at the opposite side of the machine.

Figure 3 is a top plan view.

Figure 4 is a rear elevation.

Figure 5 is an enlarged longitudinal section taken through the front end of the machine.

Figure 6 is a horizontal section through the front end of the machine.

Figure 7 is a transverse section of the same.

Figure 10:
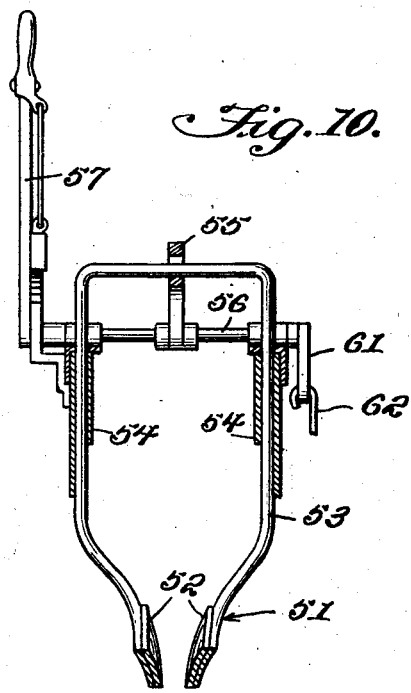

Figure 10 in an enlarged longitudinal section through one of the topping knife housings and showing the knife in elevation.

Figure 11 is an enlarged fragmentary section through the rear end of the machine.

Figure 12 is a section on the line 12—12 of Figure 11.

Figure 8:
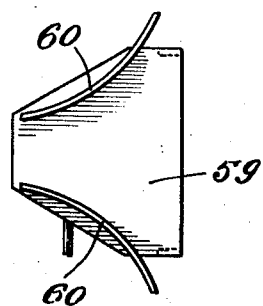
Figure 8 is an enlarged longitudinal section through the rear end of the machine.
Figure 13:
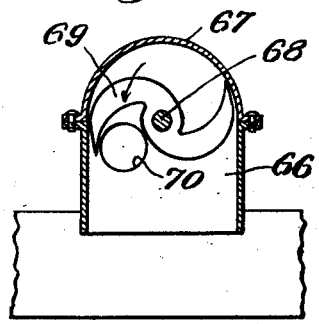
Figure 9:
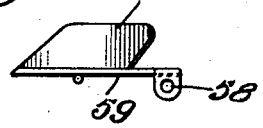
Figure 9 is a transverse sectional view of the same.

Figure 13 is a detail sectional view showing one of the topping elements.

Referring in detail to the drawings wherein like characters of reference denote corresponding parts, the machine is shown as comprising a frame which is supported upon wheels 18 at its front end, and these wheels are mounted upon an axle 19 which carries a pivot post 20 which is mounted in suitable bearings supported in the front of the frame. The pivot post 20 extends upward and has secured thereon oppositely extending horizontal arms 21 which are connected to a steering bar 22 by means of links or rods 23. The steering bar 22 is mounted upon a steering post 24 which operates in suitable bearings carried by the frame and is so arranged that the steering bar 22 will be located within convenient reach of the occupant of the operator's seat 25. This provides convenient means whereby the machine may be guided along the beet rows. Any suitable power may be employed for moving the machine and may be connected to a tongue or other member 26 secured to the front of the frame.

Pivotally mounted in bearings 27 which are carried by the frame is a substantially U-shaped frame 28, whose forward ends are shaped to provide ground engaging runners 29. The frame 28 carries cutting knives which are designed to cut away the leaves from the beets and for this purpose there is provided a plate 30 which is notched so as to provide opposite inclined cutting edges 31. Pivotally mounted upon the plate 30 as shown at 32 is a movable knife 33 and the latter is connected by means of a pitman or rod 34 with an eccentric 35.

The eccentric 35 is mounted upon a stub shaft 36 carried by the frame and this shaft also has mounted thereon a pinion 37 which is driven by a gear 38 mounted upon a shaft 39, the last mentioned shaft being driven in a manner to be hereinafter described.

The shaft 39 is mounted in bearings in the frame section 16 and carries sprockets 40 over which operates the side chains of a conveyor 41. The conveyor 41 operates between the opposite side members of the frame section 16 over idlers 42 and at the rear end of the machine the said conveyor operates over sprockets 43, the purpose being to convey the harvested beets upward and rearward to a hopper 44.

In order to properly position the cutter for the removal of the leaves from the beets there is provided an operating lever 45 which is located within convenient reach of the occupant of the seat 25. This lever is connected to the crank arm 46 of a rock shaft 47, by means of a rod 48, the said shaft being mounted in suitable bearings provided in the frame. The rock shaft 48 carries another crank arm 49 which extends forwardly and which is connected to the plate 30 by means of a rod or link 50. Thus, the cutter at the forward end of the machine may be raised or lowered as desired and positioned for the proper removal of the leaves.

Located at the rear of the leaf cutter is a beet puller 51 which includes centrally arranged parallel arms 52 located at the lower ends of a vertically disposed substantially U-shaped frame 53. This frame is slidingly mounted in bearings 54 carried by the machine frame and is engaged by a crank arm 55 which is carried by a rock shaft 56. This last mentioned rock shaft is mounted in suitable bearings upon the front of the machine frame and has secured thereto a hand lever 57 by means of which the shaft 56 may be rocked for the purpose of raising and lowering the arms 52 of the beet puller.

Pivotally secured as shown at 58 to the machine frame is a shovel or scoop 59 which is positioned to receive the beets after their removal from the ground by the beet puller. This shovel or scoop is provided with oppositely and outwardly curved guide flanges 60, between which the beets are directed to the lower end of the conveyor 41. These guide flanges further act to direct the earth clods to opposite sides of the conveyor. The rock shaft 56 has extending therefrom an additional arm 61 which is connected by means of a rod or link 62 with the shovel or scoop 59, so that when the shaft 56 is rocked to regulate the position of the beet puller 51, the shovel or scoop 59 will be simultaneously positioned so that the said shovel or scoop will always be in proper position to receive the beets.

The rear end of the machine frame is supported by wheels 63 and mounted upon this end of the frame and preferably to one side thereof is a plurality of topping elements which include casings 66 whose tops 67 are removable so that access may be had to the interior of the casing. Mounted in suitable bearings in these casings are shafts 68 which carry topping knives 69, to which access is had by means of openings 70 provided in one side of the casings. The shafts 68 extend through the opposite sides of the casings and have secured thereon pulleys 71 which are driven from a drum pulley 72 by means of belts 73. The shafts 68 preferably have mounted thereon fly wheels 74.

The drum pulley 72 is mounted upon a shaft 75 and this last mentioned shaft is driven from one of the rear wheels 63 by suitable gearing 76. Additional gearing 77 operatively connects this rear wheel with the shaft 39 at the forward end of the back section of the machine frame for the purpose of operating the conveyor and the movable knife 33 of the leaf cutter.

It might be here mentioned that the leaves after being cut from the beets are directed to one side of the machine by a deflector plate 78 which is carried by the plate 30.

The hopper 44 previously mentioned is secured to and depends from the machine frame at the rear end thereof and the conveyor 41 is designed to convey the harvested beets after they have been topped into this hopper.

The invention is susceptible of various changes in its form, proportions and minor details of construction and the right is herein reserved to make such changes as properly fall within the scope of the appended claims.

Having described the invention what is claimed is:—

1. A beet harvesting machine comprising in combination a frame, wheels supporting the frame, a leaf cutter located below the forward end of the frame, said cutter comprising a pivotally mounted frame, cutting elements carried by the pivotally mounted frame, means whereby said frame may be pivotally adjusted to regulate the elevation of the cutting elements, a beet puller, a conveyor, means for directing the beets to the conveyor, means for operating the conveyor and means operated by the conveyor operating means for operating the cutter.

2. A beet harvesting machine comprising in combination a frame, wheels supporting the frame, a leaf cutter located below the forward end of the frame, said cutter comprising a substantially U-shaped frame, means securing the U-shaped frame to the machine frame to permit of vertical pivotal movement, cutting elements carried by the U-shaped frame, means whereby said U-shaped frame may be adjusted to regulate the elevation of the cutting elements, a beet puller, a conveyor, means for directing the beets to the conveyor, means for operating the conveyor and means operated by the conveyor operating means for operating the cutter.

3. A beet harvesting machine comprising in combination a frame, wheels supporting the frame, a leaf cutter located below the forward end of the frame, said cutter comprising a substantially U-shaped frame, means securing the U-shaped frame to the machine frame to permit of vertical pivotal movement, ground engaging runners for the U-shaped frame, cutting elements carried by said U-shaped frame, means whereby the U-shaped frame may be adjusted to regulate the elevation of the cutting elements, a beet puller, a conveyor, means for directing the beets to the conveyor, means for operating the conveyor and means operated by the conveyor operating means for operating the cutter.

4. A beet harvesting machine comprising in combination a frame, wheels supporting the frame, a leaf cutter located below the forward end of the frame, said cutter comprising a substantially U-shaped frame, means securing the U-shaped frame to the machine frame to permit of vertical pivotal movement, ground engaging runners for the U-shaped frame, a cutter plate secured to the U-shaped frame and having opposed cutting edges, a knife pivotally mounted upon said plate, means whereby the U-shaped frame may be adjusted to regulate the elevation of the cutting elements, a beet puller, a conveyor, means for directing the beets to the conveyor, means for operating the conveyor and means operated by the conveyor operating means for operating the cutter.

5. A beet harvesting machine comprising in combination a frame, wheels supporting the frame, a leaf cutter located below the forward end of the frame, said cutter comprising a substantially U-shaped frame, means securing the U-shaped frame to the machine frame to permit of vertical pivotal movement, cutting elements carried by the U-shaped frame, a leaf deflector positioned above the cutting elements, means whereby the U-shaped frame may be adjusted to regulate the elevation of the cutting elements, a beet puller, a conveyor, means for directing the beets to the conveyor, means for operating the conveyor and means operated by the conveyor operating means for operating the cutter.

6. A beet harvesting machine comprising in combination a frame, wheels supporting the frame, a leaf cutter located below the forward end of the frame, said cutter comprising a substantially U-shaped frame, means securing the U-shaped frame to the machine frame to permit of vertical pivotal movement, cutting elements carried by the U-shaped frame, a vertically disposed laterally inclined leaf deflector positioned above the cutting elements, means whereby the U-shaped frame may be adjusted to regulate the elevation of the cutting elements, a beet puller, a conveyor, means for directing the beets to the conveyor, means for operating the conveyor and means operated by the conveyor operating means for operating the cutter.

7. A beet harvesting machine comprising a frame, wheels supporting the frame, a beet puller and a conveyor, a scoop located between the conveyor and beet puller to direct the beets to the conveyor, upwardly extending outwardly flared spaced guide flanges carried by the scoop and means for adjusting the beet puller and scoop vertically.

8. A beet harvesting machine comprising a frame, wheels supporting the frame, a vertically movable beet puller, a conveyor, an adjustable scoop located between the beet puller and conveyor to direct the beets upon said conveyor, a rock shaft, means connecting the rock shaft and beet puller to move the latter vertically when the shaft is rocked and adjust the position of the beet puller, and means connecting the shaft and scoop to simultaneously adjust the scoop in conformity with the adjustment of the beet puller.

In testimony whereof I affix my signature.

CLYDE A. BERGMAN.